US 8,122,032 B2

(12) United States Patent
Schilit et al.

(10) Patent No.: US 8,122,032 B2
(45) Date of Patent: Feb. 21, 2012

(54) IDENTIFYING AND LINKING SIMILAR PASSAGES IN A DIGITAL TEXT CORPUS

(75) Inventors: William N. Schilit, Menlo Park, CA (US); Okan Kolak, Mountain View, CA (US); Adam Mathes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1047 days.

(21) Appl. No.: 11/781,213

(22) Filed: Jul. 20, 2007

(65) Prior Publication Data

US 2009/0024606 A1  Jan. 22, 2009

(51) Int. Cl.
G06F 7/00 (2006.01)
G06F 17/30 (2006.01)

(52) U.S. Cl. .................................. 707/749
(58) Field of Classification Search ............ 707/749
See application file for complete search history.

(56) References Cited

U.S. PATENT DOCUMENTS

| | | | |
|---|---|---|---|
| 5,909,677 A | 6/1999 | Broder et al. | |
| 5,926,812 A | 7/1999 | Hilsenrath et al. | |
| 6,230,155 B1 | 5/2001 | Broder et al. | |
| 6,256,622 B1 | 7/2001 | Howard et al. | |
| 6,349,296 B1 * | 2/2002 | Broder et al. | 1/1 |
| 6,370,551 B1 | 4/2002 | Golovchinsky et al. | |
| 6,411,953 B1 | 6/2002 | Ganapathy et al. | |
| 6,615,209 B1 | 9/2003 | Gomes et al. | |
| 6,658,626 B1 | 12/2003 | Aiken | |
| 6,665,837 B1 | 12/2003 | Dean et al. | |
| 6,859,800 B1 | 2/2005 | Roche et al. | |
| 7,139,752 B2 | 11/2006 | Broder et al. | |
| 7,146,361 B2 | 12/2006 | Broder et al. | |
| 7,277,766 B1 | 10/2007 | Khan et al. | |
| 7,536,408 B2 | 5/2009 | Patterson | |
| 7,660,819 B1 * | 2/2010 | Frieder et al. | 707/999.107 |
| 7,673,344 B1 | 3/2010 | Rowney | |
| 7,734,627 B1 | 6/2010 | Tong | |
| 2001/0000356 A1 | 4/2001 | Woods | |
| 2002/0052730 A1 | 5/2002 | Nakao | |
| 2002/0123994 A1 | 9/2002 | Schabes et al. | |
| 2002/0161570 A1 | 10/2002 | Loofbourrow et al. | |
| 2004/0064438 A1 | 4/2004 | Kostoff | |
| 2004/0117366 A1 | 6/2004 | Ferrari et al. | |
| 2005/0165600 A1 | 7/2005 | Kasravi | |
| 2005/0198070 A1 | 9/2005 | Lowry | |

(Continued)

OTHER PUBLICATIONS

Andrei Z. Broder et al., *Syntactic Clustering of the Web*, [online], SRC Technical Note 1997-015, Jul. 25, 1997, pp. 1-13, Retrieved from the URL:<http://gatekeeper.dec.com/pub/DEC/SRC/technical-notes/SRC-1997-015-html/>.

(Continued)

*Primary Examiner* — Greta Robinson
*Assistant Examiner* — Jeffrey Chang
(74) *Attorney, Agent, or Firm* — Fenwick & West LLP

(57) ABSTRACT

A corpus contains digital text from multiple documents. A passage mining engine identifies similar passages in the documents and stores data describing the similarities. The passage mining engine groups similar passages into groups based on degree of similarity or other criteria. The passage mining engine ranks the similar passages found in the text corpus based on quality or other criteria. A user interface is presented that includes hypertext links associated with the similar passages that allow a user to navigate the documents.

23 Claims, 10 Drawing Sheets

U.S. PATENT DOCUMENTS

| | | |
|---|---|---|
| 2006/0020607 A1 | 1/2006 | Patterson |
| 2006/0129538 A1 | 6/2006 | Baader et al. |
| 2006/0143175 A1 | 6/2006 | Ukrainczyk et al. |
| 2006/0287971 A1 | 12/2006 | Armstrong |
| 2007/0055926 A1 | 3/2007 | Christiansen et al. |
| 2007/0136281 A1 | 6/2007 | Li et al. |
| 2008/0033982 A1 | 2/2008 | Parikh et al. |
| 2008/0046394 A1 | 2/2008 | Zhou et al. |

OTHER PUBLICATIONS

Sergey Brin et al., *Copy Detection Mechanisms for Digital Documents*, International Conference on Management of Data, Proceedings of the 1995 ACM SIGMOD International Conference on Management of Data, 1995, pp. 398-409, ISBN: 0-89791-731-6, San Jose, CA, USA.

Patrik D'Haeseleer, *How does DNA sequence motif discovery work?*, Nature Biotechnology, Aug. 2006, pp. 959-961, vol. 24, No. 8.

Theodor Holm Nelson, *Xanalogical Structure, Needed Now More than Ever: Parallel Documents, Deep Links to Content, Deep Versioning and Deep Re-Use*, ACM Computing Surveys (CSUR), Dec. 1999, vol. 31, Issue 4es, ISBN:0360-0300.

PCT International Search Report and Written Opinion, PCT/US2008/070557, Oct. 22, 2008, 11 pages.

* cited by examiner

Six Degrees of Separation By John Guare — 910

OUISA. (To us.) Can you believe it? Paul learned all that in Three months. Three months! Who would have thought it? Trent Conway, the Henry Higgins of our time. Paul looked at those names and said I am Columbus. I am Magellan. I will sail into this new world. I read somewhere that ever body on this planet is separated by only six other people. Six degrees of separation. Between us and everybody else on this planet The President of the United States. A gondolier in Venice. Fill in the names. I find that A) tremendously comforting that we're so close and it's like Chinese water torture that we're so — 928

Page 45

≡ Summary — 912
914
About this book — 916
918
≡ Popular Passages — 920
"I read somewhere that everybody — 922
on this planet is separated by only
six other peole. Siz degrees of
separation. Between us and
everybody else this planet...".
Page 45 — 924
Appears in 13 books from 2000-2006 — 926
"we took a carriage ride in the park
and he asked me if he could
me and I had never done anything
like that and he did and it was
fantastic..." - Page 51
Appears in 5 books from 2002-2006
"I believe imagination is the passport
we create to take us into the real
world...". Page 25
Appears in 4 books from 2002-2006
more >

FIG. 9

IDENTIFYING AND LINKING SIMILAR PASSAGES IN A DIGITAL TEXT CORPUS

BACKGROUND OF THE INVENTION

1. Field of the Invention

This invention pertains in general to data mining a large corpus of text and in particular to identifying and navigating similar passages in a digital text corpus.

2. Description of the Related Art

Advancement in digital technology has changed the way people acquire information. For example, people now can view electronic documents that are stored in a predominantly text corpus such as a digital library that is accessible via the Internet. Such a digital text corpus is established, for example, by scanning paper copies of documents including books and newspapers, and then applying an optical character recognition (OCR) process to produce computer-readable text from the scans. The corpus can also be established by receiving documents and other texts already in machine-readable form.

Unlike in a hypertext corpus, a document in a digital text corpus rarely contains functional links to other documents either in the same corpus or in other corpora. Moreover, mining references from the text of documents in a digital text corpus to support general link-based browsing is a difficult task. Functional hypertext references such as URLs are rare. Citations and other forms of inline references are also seldom used outside of scholarly and professional works.

This lack of a link structure makes it difficult to browse documents in the corpus in the same manner that one might browse a set of web pages on the Internet. As a result, browsing the documents in the corpus can be less stimulating than traditional web browsing because one can not browse by related concept or by other characteristics.

SUMMARY OF THE INVENTION

The above and other difficulties are addressed by a computer-implemented method, computer program product, and computer system that identifies similar passages in a plurality of documents stored in a corpus. Embodiments of the method, product, and system build a shingle table describing shingles found in the corpus, the one or more documents in which the shingles appear, and locations in the documents where the shingles occur. In addition, the method, product, and system identify a sequence of multiple contiguous shingles that appears in a source document in the corpus and in at least one other document in the corpus and generate a similar passage in the source document based at least in part on the sequence of multiple contiguous shingles. The method, product, and system also store data describing the similar passage.

Another embodiment of the computer program product comprises program code including a user interface module configured to display a passage presentation region displaying a ranked list of similar passages found in a source document stored in a corpus, the similar passages in the list also found in one or more other documents stored in the corpus and provide a hypertext link in association with a similar passage in the list that, upon selection, enables navigation to another document in the corpus in which the similar passage is found.

Another embodiment of the method comprises identifying a group of words found in a source document in the corpus and identifying one or more target documents in the corpus that also contain the group of words. The method generates a similar passage in the source document based at least in part on the group of words found in the source document and in the one or more target documents and stores data describing the similar passage.

Yet another embodiment of the method comprises identifying a group of words found in a source document in the corpus and identifying one or more target documents in the corpus that also contain the group of words. The method also generates a similar passage in the source document based at least in part on the group of words found in the source document and in the one or more target documents and creates a link structure including one or more links associating the similar passage in the source document with the group of words contained in the one or more target documents. The method further stores data describing the link structure.

BRIEF DESCRIPTION OF THE DRAWINGS

FIG. 9 illustrates a sample web page presenting information about the book "Six Degrees of Separation."

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
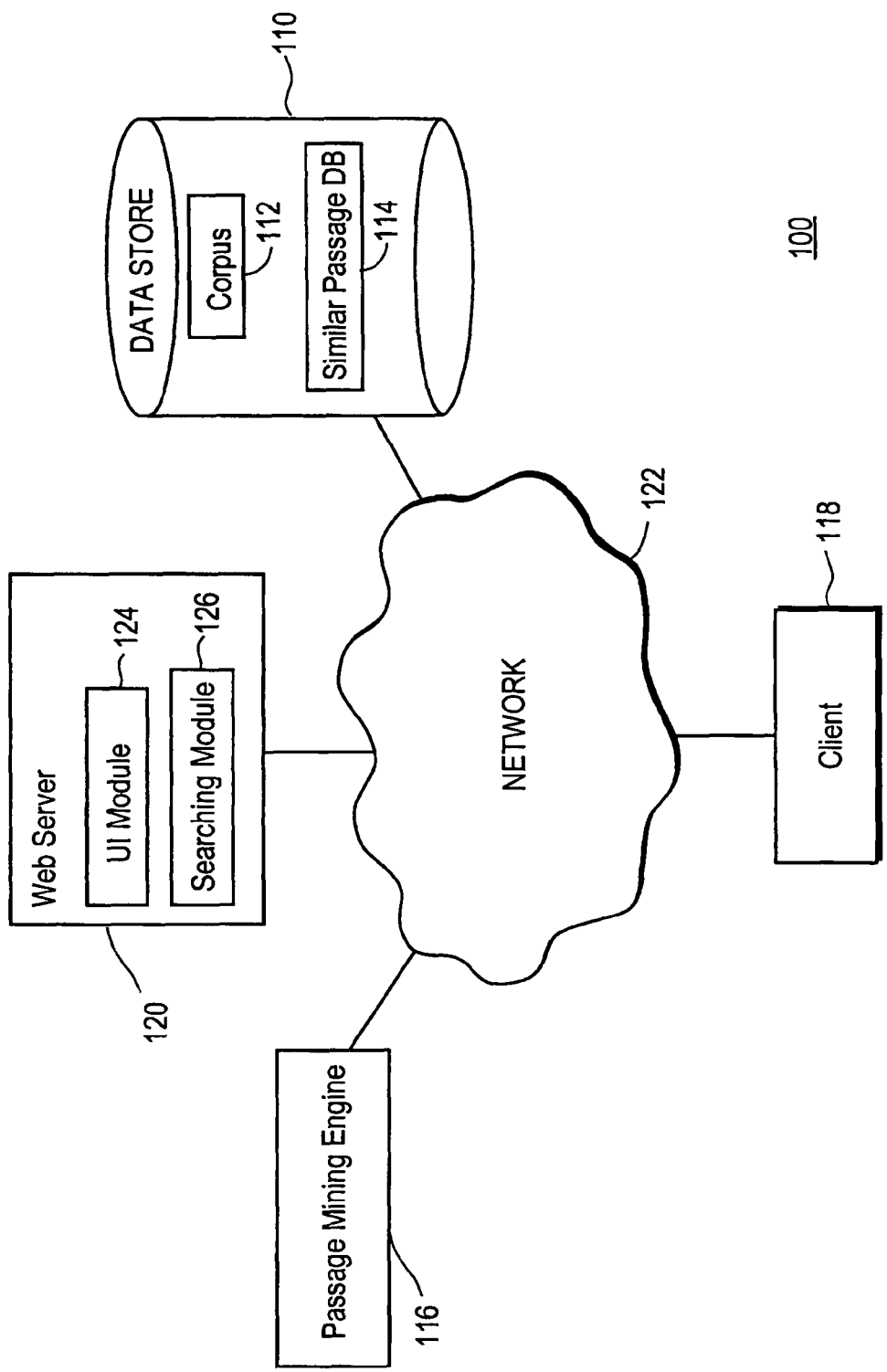
FIG. 1 shows an environment adapted to support passage mining according to one embodiment.

FIG. 1 shows an environment 100 adapted to support identifying and navigating similar passages of text in a digital text corpus 112 according to one embodiment. The environment 100 includes a data store 110 for storing the corpus 112 and a similar passage database 114, and a passage mining engine 116 for identifying similar passages in the corpus. The environment also includes a client 118 for requesting and/or viewing information from the data store 110, and a web server 120 for interacting with the client and providing interfaces allowing the client to access the information in the data store. A network 122 enables communications between and among the data store 110, passage mining engine 116, client 118, and web server 120.

Not all the entities shown in FIG. 1 are required to be connected to the network 122 at the same time for the functionalities described herein to be realized. In one embodiment, passage mining engine 116 is connected to the network 122 periodically. When it is online, the mining engine 116 only needs to communicate with the data store 110 in order to identify similar passages in the corpus 112 and store the passage data in the passage database 114. The passage mining engine 116 does not need to interact with the client 118 or the web server 120 according to one embodiment. Once identifying similar passages is finished, the passage mining engine 116 may be off-line, and the web server 120 supports passage navigating by interacting with the client 118 and the data store 110 to retrieve information from the data store that is requested by the client. Moreover, different embodiments of the environment 100 include different and/or additional entities than the ones shown in FIG. 1, and the entities are organized in a different manner.

The data store 110 stores the corpus 112 of information and the similar passage database 114. It also stores data utilized to support the functionalities or generated by the functionalities described herein. The data store 110 can also store one or more other corpora and data. The data store 110 receives requests for information stored in it and provides the information in return. In a typical embodiment, the data store 110 is comprised of multiple computers and/or storage devices configured to collectively store a large amount of information.

The corpus 112 stores a set of information. In one embodiment, the corpus 112 stores the contents of a large number of digital documents. As used herein, the term "document" refers to a written work or composition. This definition includes, for example, conventional books such as published novels, and collections of text such as newspapers, magazines, journals, pamphlets, letters, articles, web pages and other electronic documents. The document contents stored by the corpus 112 include, for example, the document text represented in a computer-readable format, images from the documents, scanned images of pages from the documents, etc. In one embodiment, each document in the corpus 112 is assigned a unique identifier referred to as its "Doc ID", and each word in the document is assigned a unique identifier that describes its position in the document and is referred to as its "Pos ID." As used herein, the term "word" refers to a token containing a block of structured text. The word does not necessarily have meaning in any language, although it will have meaning in most cases.

In addition, the corpus 112 stores metadata about the documents within it. The metadata are structured data that describe the documents. Examples of metadata include metadata about a book such as the author, publisher, year published, number of pages, and edition.

The similar passage database 114 stores data describing similar passages in the corpus 112. In one embodiment, the passage database 114 is generated by the passage mining engine 116 to store information obtained from passage mining. In some embodiments, the passage mining engine 116 constructs the passage database 114 by copying existing quotation collections such as Bartlett's, and searching and indexing the instances of quotations and their variations that appear in the corpus 112. In some embodiments, the passage mining engine 116 constructs the passage database 114 by copying existing text appearing in a quoted form, such as delimited by quotation marks, from the corpus, and searching and indexing the instances of phrases in the corpus 112. Further, in some embodiments the passage mining engine 116 constructs the passage database 114 by copying each group of words, such as sentences, from the corpus, and searching and indexing the instances of the group of words in the corpus 112. In one embodiment, the database 114 stores similar passages, Doc IDs of the documents in which the passages exist, Pos IDs within the documents at which the passages appear, passage ranking results, etc. Further, in some embodiments, the database 114 also stores the documents or portions of the documents that have the similar passages.

The passage mining engine 116 includes one or more computers adapted to analyze the texts of documents in the corpus 112 in order to identify similar passages. As used herein, the phrase "similar passage" refers to a passage in a source document that is found in a similar form in one or more different target documents. Oftentimes, the passages in the target documents are identical to the passage in the source document. Nevertheless, the passages are referred to as "similar" because there might be slight differences among the passages in the different documents. When a source document is said to have multiple "similar passages," it means that multiple passages in the source document are also found in target documents. This phrase does not necessarily mean that the "similar passages" within the source document are similar to each other.

The passage mining engine 116 also ranks multiple similar passages found in one document, and stores these passage data in the similar passage database 114. For example, the passage mining engine 116 may find that the passage "I read somewhere that everybody on this planet is separated by only six other people" from the book "Six Degrees of Separation" by John Guare, also appears in 13 other books published between 2000 and 2006. The passage mining engine 116 may store, in the similar passage database 114, the passage, its location in the book, Doc IDs of the 13 other books, its location in the 13 books, and its ranking relative to other passages in the book.

Passage mining may be performed off-line, asynchronously of any queries made by client 118 against the data store 110. In one embodiment, the passage mining engine 116 runs periodically to process all the text information in the corpus 112 from scratch and generate similar passage data for storing in the similar passage database 114, disregarding any information obtained from prior passage mining. In another embodiment, the passage mining engine 116 is used periodically to incrementally update the data stored in the similar passage database 114, for example, as new documents are added to the corpus 112.

In one embodiment, the client 118 is an electronic device having a web browser for interacting with the web server 120 via the network 122, and it is used by a human user to access and obtain information from the data store 110. It can be, for example, a notebook, desktop, or handheld computer, a mobile telephone, personal digital assistant (PDA), mobile email device, portable game player, portable music player, computer integrated into a vehicle, etc.

The web server 120 interacts with the client 118 to provide information from the data store 110. In one embodiment, the web server 120 includes a User Interface (UI) module 124 that communicates with the client's 118 web browser to receive and present information. The web server 120 also includes a searching module 126 that searches for information in the data store 110. For example, the UI module 124 may receive a document query from the web browser issued by a user of the client 118, and the searching module 126 may execute the query against the corpus 112 and the similar passage database 114, and retrieve information including similar passages information that satisfies the query. The UI module 124 then interacts with the web browser on the client 118 to present the retrieved information in hypertext. In one embodiment, hyperlinks are provided to allow the user of the client 118 to navigate to the portions of a document that contains similar passages, or to browse other documents that share the similar passages, much like the way traditional web-browsing is conducted.

The network 122 represents communication pathways between the data store 110, passage mining engine 116, client 118, and web server 120. In one embodiment, the network 122 is the Internet. The network 122 can also utilize dedicated or private communications links that are not necessarily part of the Internet. In one embodiment, the network 122 uses standard communications technologies, protocols, and/or interprocess communications techniques. Thus, the network 122 can include links using technologies such as Ethernet, 802.11, integrated services digital network (ISDN), digital subscriber line (DSL), asynchronous transfer mode (ATM), etc. Similarly, the networking protocols used on the network 122 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 122 can be represented using technologies and/or formats including the hypertext markup language (HTML), the extensible markup language (XML), etc. In addition, all or some of links can be encrypted using conventional encryption technologies such as the secure sockets layer (SSL), HTTP over SSL (HTTPS), and/or virtual private networks (VPNs). In another embodiment, the nodes can use custom and/or dedicated data communications technologies instead of, or in addition to, the ones described above.

Figure 2:
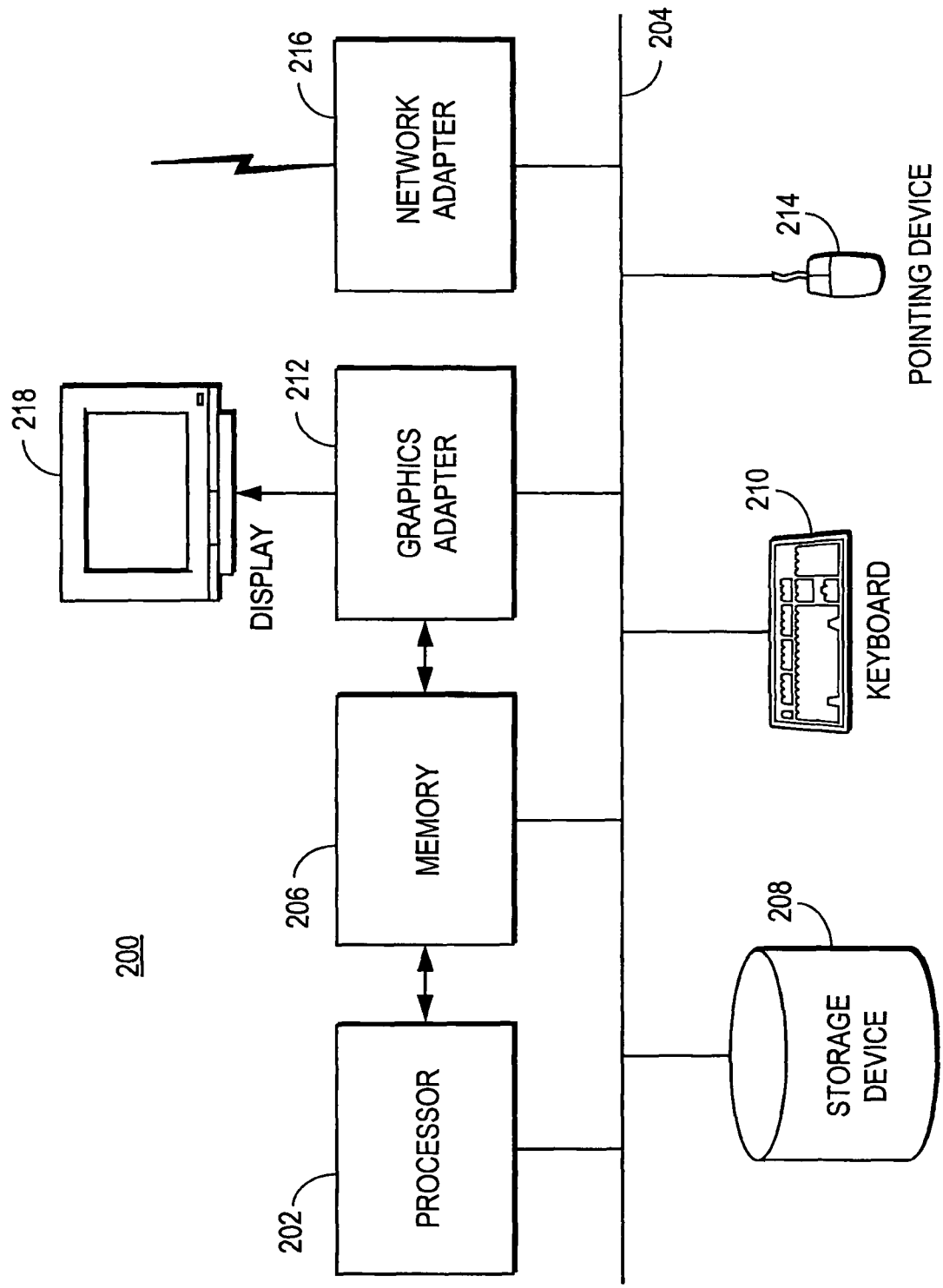
FIG. 2 is a high-level block diagram illustrating a functional view of a typical computer for use as one of the entities illustrated in the environment of FIG. 1 according to one embodiment.

FIG. 2 is a high-level block diagram illustrating a functional view of a typical computer 200 for use as one or more of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 122.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202 as one or more processes.

The types of computers used by the entities of FIG. 1 can vary depending upon the embodiment and the processing power utilized by the entity. For example, the client 118 typically requires less processing power than the passage mining engine 116 and web server 120. Thus, the client 118 system can be a standard personal computer or a mobile telephone. The passage mining engine 116 and web server 120, in contrast, may comprise processes executing on more powerful computers, logical processing units, and/or multiple computers working together to provide the functionality described herein. Further, the passage mining engine 116 and web server 120 might lack devices that are not required to operate them, such as displays 218, keyboards 210, and pointing devices 214.

Figure 3:
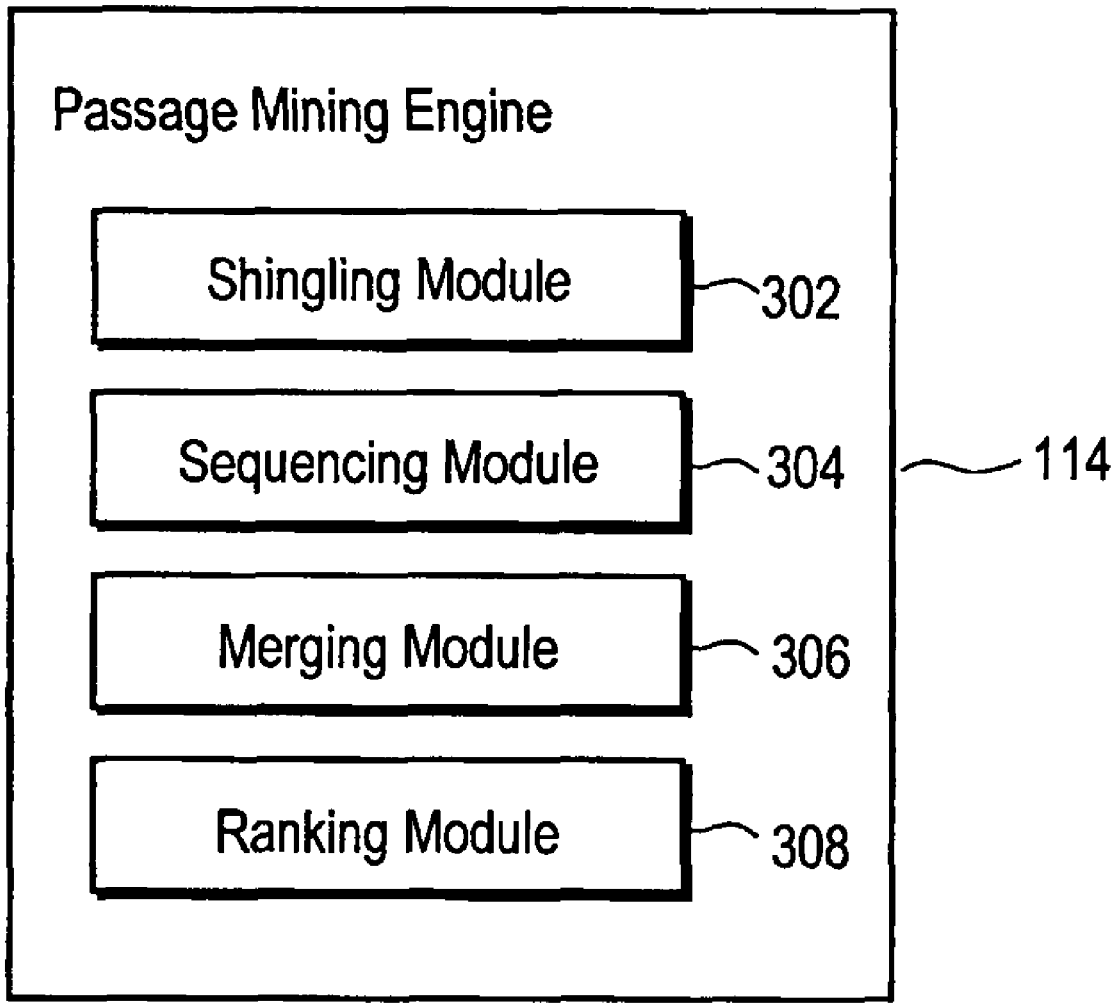
FIG. 3 is a high-level block diagram illustrating modules within the passage mining engine according to one embodiment.

FIG. 3 is a high-level block diagram illustrating modules within the passage mining engine 116 according to one embodiment. As mentioned above, an embodiment of the passage mining engine 116 identifies similar passages in the corpus 112, ranks them, and stores the passage information in the similar passage database 114. Some embodiments have different and/or additional modules than those shown in FIG. 3. For example, according to one embodiment, the passage mining engine 116 has only two modules, a searching module and a ranking module. The searching module searches and indexes the instances of quotations in the corpus 112 based on an existing quotation collection, and the ranking module ranks the quotations and the instances of the quotations. Moreover, the functionalities can be distributed among the modules in a different manner than described here.

A shingling module 302 generates a shingle table 500 for all the documents in the corpus 112. As used herein, the term "shingle" refers to a group of adjacent words sequenced in the reading order of a text. As described above, the term "word" refers to a token containing a block of structured text. In one embodiment, every word in the text is normalized. For example, the shingling module 302 converts the alphabetic characters into lower case and tokenizes the text. The number of words in a shingle, referred to as shingle size, can be any non-zero integer such as 4, 5, 12, etc. In one embodiment, 8-shingling is used, i.e. each shingle contains 8 words. Contiguous shingles are formed by moving one word in the reading order of the text, so that contiguous shingles have overlapping sets of words. For example, there are 5 contiguous shingles in the 7-shingling of the phrase "everybody on this planet is separated by only six other people", i.e., "everybody on this planet is separated by", "on this planet is separated by only", "this planet is separated by only six", "planet is separated by only six other", and "is separated by only six other people."

In one embodiment, all the tokens for punctuation and stopwords are excluded from any shingle. Stopwords include words that are common and do not have meaning when considered individually, such as "the" and "of". For example, the 2-shingling of the text "After the big surge of Internet" includes 3 shingles, i.e., "after big", "big surge", and "surge internet" according to one embodiment. For a pre-defined shingle size, the shingling module 302 generates a shingle table that specifies all the distinct shingles in the corpus 112, the documents in which the shingles are found, and the locations of the shingles within the documents.

A sequencing module 304 uses the shingle table 500 to build sequences. A "sequence" is formed of one or more contiguous shingles that appear in a given document and at least one other document in the corpus 112. For example, "everybody on this planet is separated by only six" is a sequence made of 3 contiguous shingles, i.e., "everybody on this planet is separated by", "on this planet is separated by only", and "this planet is separated by only six". In one embodiment, distributed computing is used to compare shingles in each document with those in each other document in the corpus 112. For a given document, the sequencing module 304 examines all the shingles in the document in sequence, and when it determines that another document has the same group of contiguous shingles, it forms a sequence that is shared between the given document and the other document. In one embodiment, the document that is currently being examined is referred to as the "source document", and the other document that shares the sequence is referred to as the "target document." For each and every document in the corpus 112, the sequencing module 304 examines it as a source document, identifies its target documents, and builds sequences it has in common with the target documents.

A merging module 306 merges the sequences to identify similar passages in documents. In one embodiment, for each document in the corpus 112, the merging module 306 merges overlapping sequences from different target documents into a long sequence. Such a long merged sequence corresponds to a similar passage in the source document. Similarly, the pre-merge overlapping sequences define portions of the similar passage that appear in various target documents. In one embodiment, the similar passage defined by the long merged sequence is displayed in association with the source document. The portions of the similar passage defined by the pre-merge sequences are displayed with the target documents.

A ranking module 308 ranks the similar passages identified in a given document. In one embodiment, it uses heuristics that consider both the length of a passage and its frequency of occurrence in other documents. The rankings are used for purposes including displaying the passages in an order and identifying a high-ranking subset of passages to display. Based on the ranking results, all or only a subgroup of the similar passages may be identified as "popular passages" in a given document.

In one embodiment, the target documents for a given "popular passage" are also ranked using heuristics that consider one or more other factors in addition to, or instead of, the factors described above. These other factors include the fraction of the passage that is repeated in the document, content relevance, popularity associated with user actions, publishing dates, etc. When a user at client 118 requests to view more information about the target documents, these ranking results can be used to decide which documents to display and the order in which they are displayed.

Figure 4:
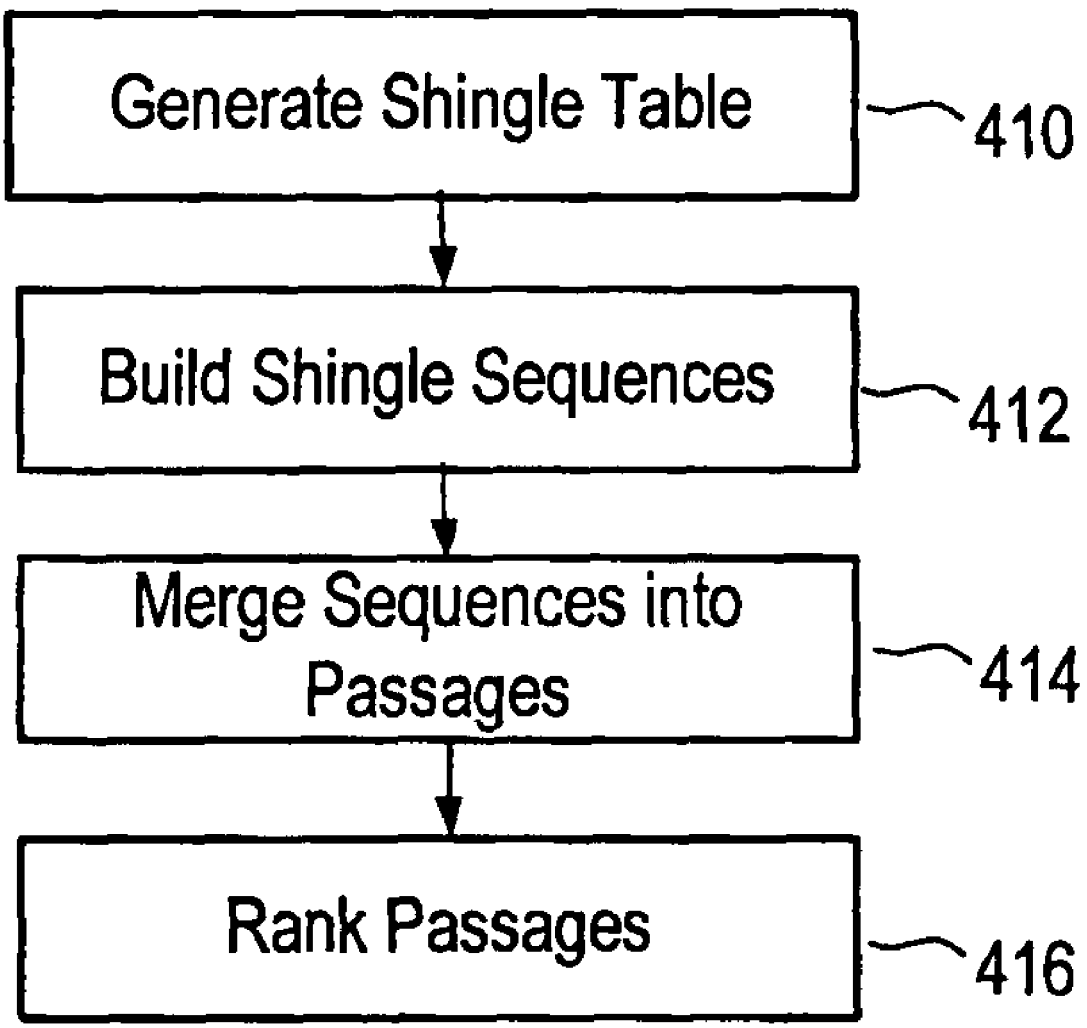
FIG. 4 is a flow chart illustrating steps performed by the passage mining engine to mine passages according to one embodiment.

FIG. 4 is a flow chart illustrating steps performed by the passage mining engine 116 to mine passages according to one embodiment. Other embodiments may perform the steps in different orders and/or perform different or additional steps than the ones shown in FIG. 4. For example, in one embodiment, shingling, sequencing, and merging may be replaced by starting with a collection of similar passages and applying an approximate search to find these passages within the digital text corpus 112.

As shown in FIG. 4, the passage mining engine 116 generates 410 a shingle table 500 describing the occurrence information of shingles in the corpus 112. Each unique shingle is assigned an identifier referred to as its "shingle ID." For each shingle, all the documents that contain the shingle are identified, and the positions at which the shingle appears in the documents are recorded. In one embodiment, the passage mining engine 116 generates 410 a shingle table, referred to as "global shingle table" to describe all the distinct shingles in all of the documents in the corpus 112. In some embodiments, the passage mining engine 116 generates 410 a shingle table, referred to as a "per-document shingle table", for each document that contains the occurrence information for the distinct shingles appearing in only that document. In other embodiments, if a shingle appears in only one document, the shingle is excluded from any shingle table. Such a shingle defines a source gap in the document in which it appears. Other embodiments utilize combinations of the shingle tables described above.

Figure 5:
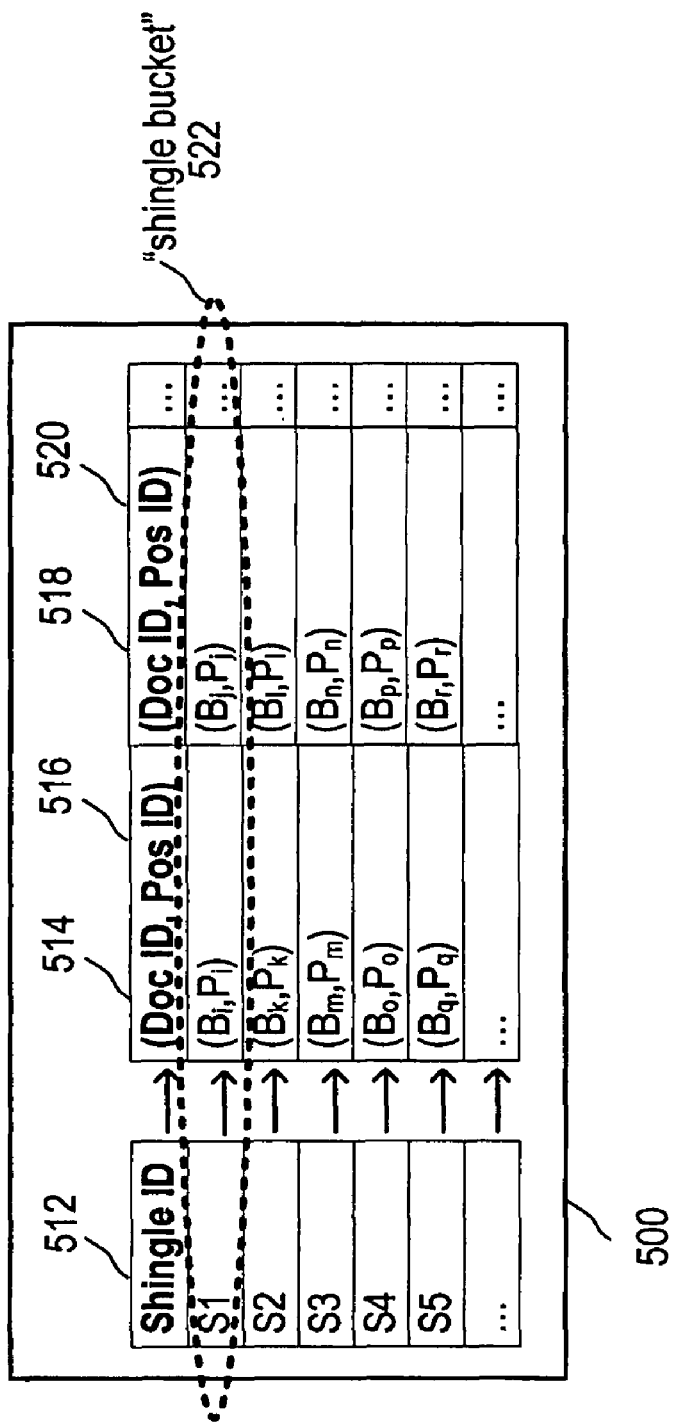
FIG. 5 illustrates a sample shingle table generated by the shingling module according to one embodiment.

FIG. 5 illustrates a sample shingle table 500 generated by the passage mining engine 116 according to one embodiment. Each row of the shingle table has the occurrence information for a distinct shingle in the corpus 112. The leftmost column 512 of the table identifies the shingle by its shingle ID. The row extending rightward from column 512 identifies the documents in which the shingle appears by Doc IDs 514, 518, and the positions within the respective documents where the shingle is located by Pos IDs 516, 520. In one embodiment, a row of the shingle table is referred to as a "shingle bucket" 522. If a shingle appears in only one document, there is no shingle bucket for that shingle. It should also be noted that table 500 may be a global shingle table according to one embodiment, or may be a per-document shingle table according to another embodiment.

Figure 6:
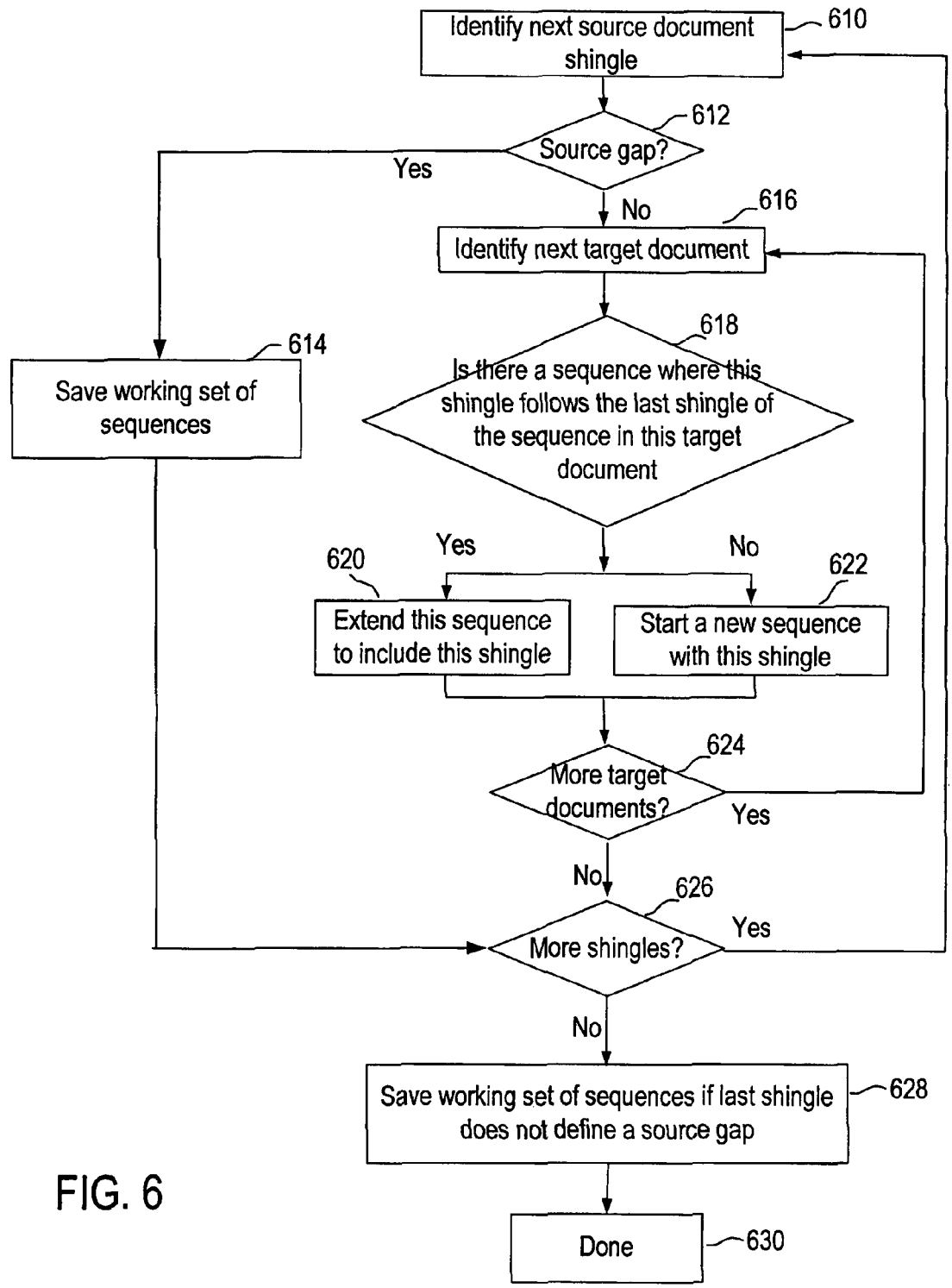
FIG. 6 is a flow chart illustrating steps performed for building sequences according to one embodiment.
Figure 7:
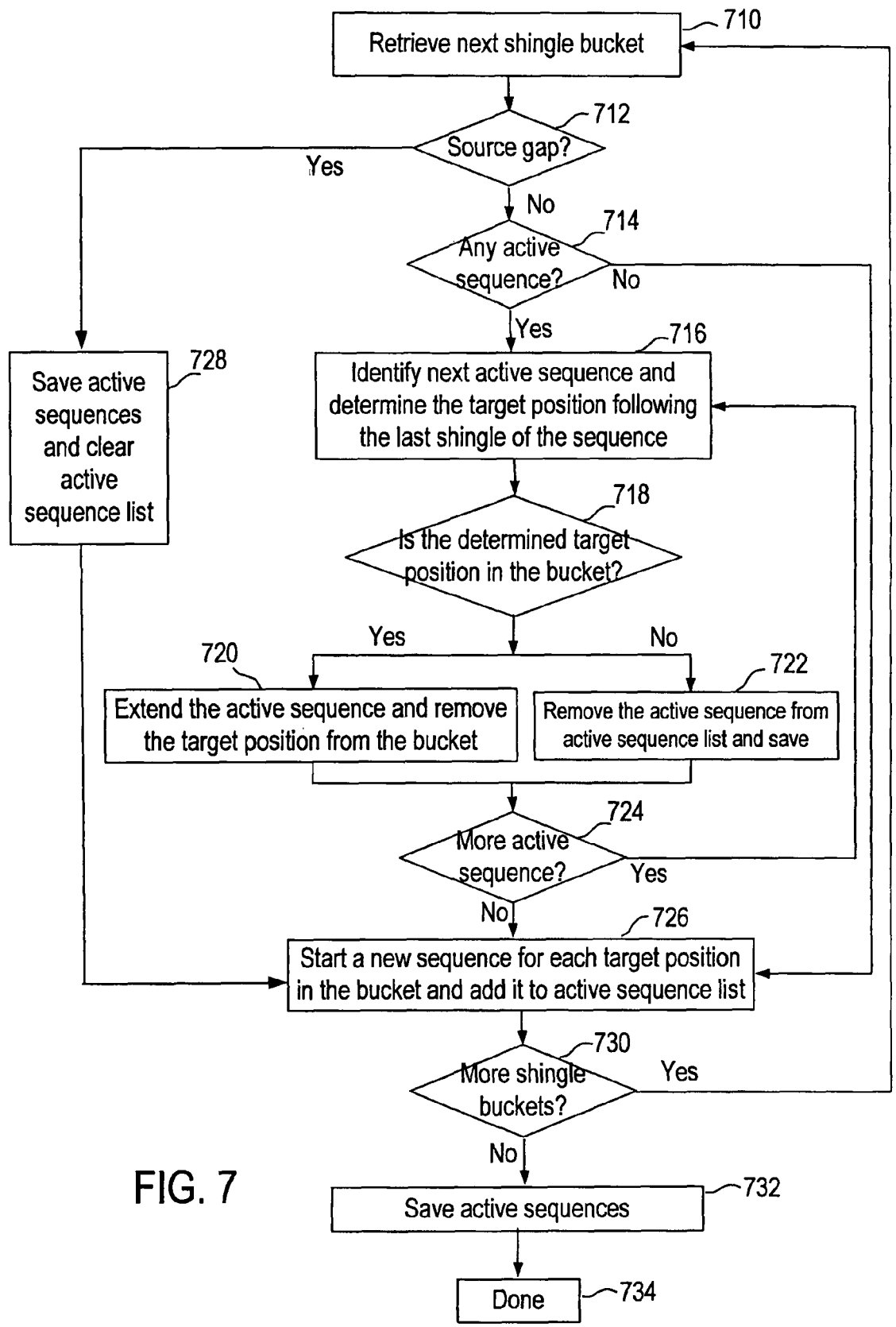
FIG. 7 is a flow chart illustrating steps performed for building sequences according to another embodiment.

Next, the passage mining engine 116 uses the shingle table 500 to build 412 sequences for each document in the corpus 112. Sequencing 412 may be implemented in different ways. FIG. 6 is a flow chart illustrating steps performed for building 412 sequences according to one embodiment. FIG. 7 is a flow chart illustrating steps performed for building 412 sequences according to another embodiment. Other embodiments may perform sequencing steps in different orders and/or perform different or additional steps than the ones shown in FIGS. 6 and 7.

Referring to FIG. 6, the passage mining engine 116 examines each shingle of the source document in sequence. The engine 116 identifies 610 the next shingle and uses the shingle table 500 to determine 612 whether the shingle defines a source gap. If the shingle defines a source gap, the engine 116 saves 614 the working set of sequences. If the shingle does not define a source, i.e., there are target documents sharing the shingle, the engine 116 identifies 616 the next target document, and further determines whether 618 there is a sequence where the identified shingle immediately follows the last shingle of the sequence in the identified target document. If there is such a sequence, the passage mining engine 116 extends 620 the sequence to include the identified shingle. If there is not such a sequence, the engine 116 starts 622 a new sequence with the identified shingle. The process is performed for all target documents 624 sharing the identified shingle and then for all other shingles 626 in the source document. When all the shingles have been examined, the passage mining engine 116 saves 628 the last working set of sequences, if the last shingle does not define a source gap, i.e., the working set of sequences is not saved.

In another embodiment, the passage mining engine 116 uses the shingle buckets 522 to perform sequencing 412. A per-document shingle table 500 is constructed by placing rows of shingle buckets in an order corresponding to their appearing sequence in a source document, and the shingles in the source document are examined in sequence. As illustrated in FIG. 7, the mining engine 116 begins by retrieving 710 the next shingle bucket from the shingle table 500. It first determines whether the shingle bucket does not indicate a source gap 712 and whether there are any sequences in an active sequence list 714. If both determinations are positive, the engine 116 uses the list to identify the next active sequence, and then determines the target position, $T_p$, that immediately follows the last shingle of the identified sequence in the target document associated with the sequence 716. The passage mining engine 116 then searches the shingle bucket to decide whether $T_p$ is present in the bucket 718. If $T_p$ is in the bucket, the engine 116 extends the identified active sequence and removes $T_p$ from the bucket 720. If $T_p$ is not in the bucket, the engine 116 removes the identified sequence from the active sequence list 722, saves the identified sequence, and considers the next sequence in the active sequence list 724. After all sequences in the active sequence list are examined 724, or when there is no sequence in the active sequence list 714, the passage mining engine 116 starts a new sequence for each remaining target position in the shingle bucket, and adds the newly created sequence to the active sequence list 726. If the shingle bucket indicates a source gap at step 712, the engine 116 saves the active sequences and clears the active sequence list 728. Then, the engine 116 starts a new sequence for each target position in the bucket and adds the newly created sequence to the active sequence list 726. If the shingle bucket does not indicate a source gap, processing continues to step 714. The process next retrieves the remaining shingle bucket, if there is any. When there is no more shingle bucket left in the shingle table, the passage mining engine 116 saves the active sequences 732 and the sequencing 412 is done 734.

Figure 8:
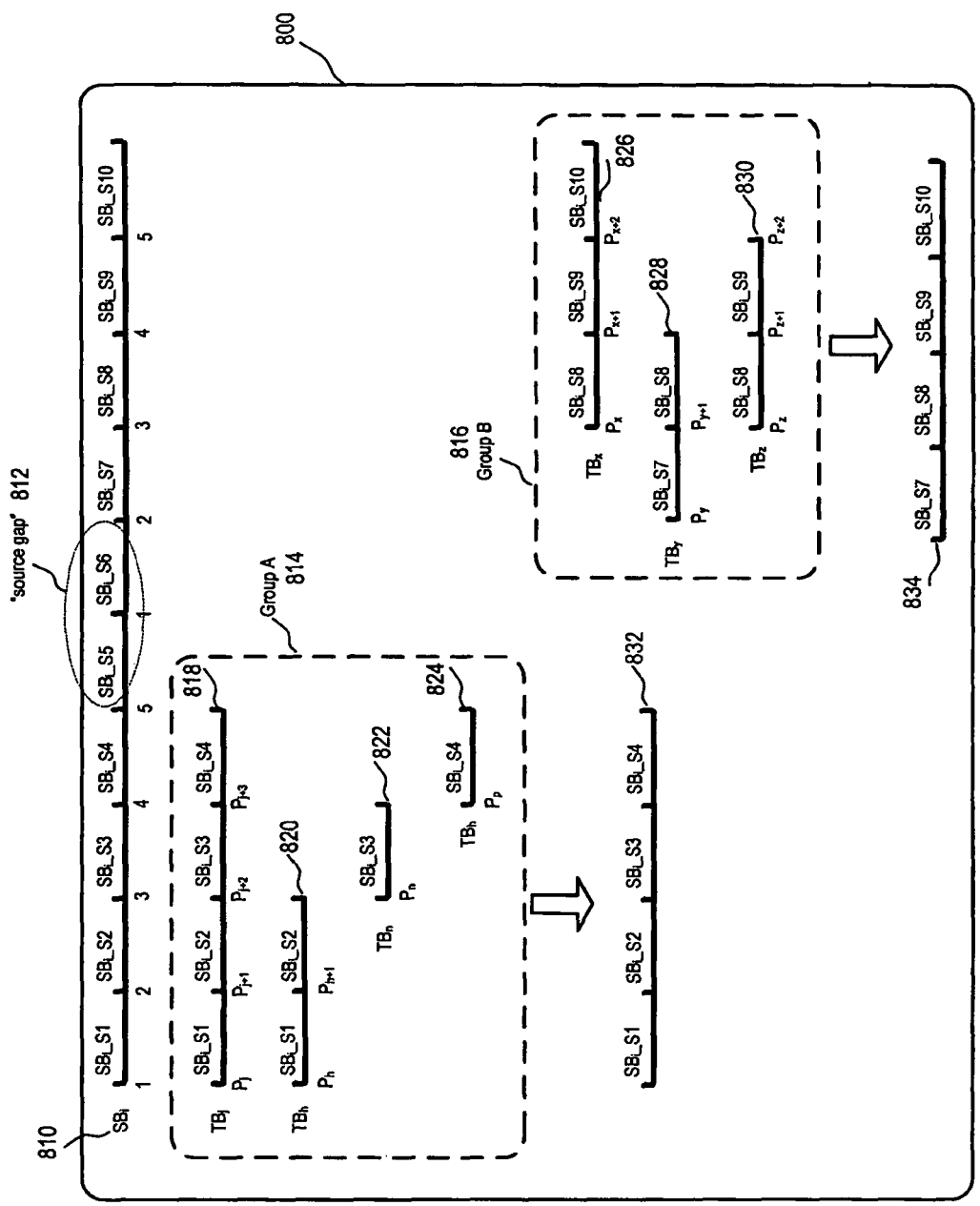
FIG. 8 illustrates a sample workspace for sequencing and sequence merging according to one embodiment.

FIG. 8 illustrates a sample workspace 800 for sequencing 412 and sequence merging 414 according to one embodiment. At the top of the workspace 800 are ten consecutive shingles 810, $SD_i\_S1$ to $SD_i\_S10$, from a source document $SD_i$. Among them, $SD_i\_S5$ and $SD_i\_S6$ define source gaps 812 since these shingles appear in only document $SD_i$. Two groups of sequences, group A 814 and group B 816, are also shown in the workspace 800, and are separated by the source gaps 812. Each group, 814, 816, includes multiple sequences, and each sequence is associated with a target document. For example, sequence 818 is associated with target document $TB_j$. The same target document may be related to more than one sequence, for example, in group A 814, $TB_h$ corresponds to two sequences, 820 and 824, both of which it shares with $SD_i$.

In the following description, group A 814 is used as an illustration to demonstrate how sequencing 412 and grouping is performed according to one embodiment. Starting with the first shingle, $SD_i\_S1$, the passage mining engine 116 finds target documents $TB_j$ and $TB_h$ having the same shingle, and it starts two new sequences, 818 and 820, for $TB_j$ and $TB_h$, respectively. Since both $TB_j$ and $TB_h$ also have the next shingle, $SD_i\_S2$, and the shingle's positions, $P_{j+1}$ and $P_{h+1}$, are adjacent to those of the previous shingle, $P_j$ and $P_h$, respectively, the passage mining engine 116 extends both sequences 818 and 820.

Next the passage mining engine 116 steps to shingle $SD_i\_S3$. It finds that target documents $TB_j$ and $TB_n$ have the shingle. In $TB_j$, the current position, $P_{j+2}$, is adjacent to that of $SD_i\_S2$, i.e., $P_{j+1}$, so existing sequence 818 is extended. In the case of $TB_n$, since it does not have previous shingle $SD_i\_S2$, the passage mining engine 116 starts a new sequence 822 for $TB_n$.

The same process occurs for shingle $SD_i\_S4$, and existing sequence 818 is further extended and new sequence 824 is created. At last the passage mining engine 116 reaches $SD_i\_S5$ and determines that this shingle defines a source gap. Accordingly, it saves the working set of sequences, i.e., 818, 820, 822 and 824, and this working set defines group A 814. Other groups including group B 816 may be constructed and processed similarly. Thus, at the end of the sequence building step 412, zero or more sequences are generated. In one embodiment, the sequences fall into groups with borders defined by source gaps. Although this description uses the term "group" to refer to a collection of sequences within borders defined by the source gaps, some embodiments do not organize the sequences into explicit groups. Rather, the groups are implicitly defined by the source gaps.

Once the groups are defined, the passage mining engine 116 analyzes the groups for each document and merges 414 sequences within the groups to define similar passages. There are different ways to implement sequence merging 414. In one embodiment, all the overlapping sequences in a group are merged with each other to form at least one long sequence. In another embodiment, the longest sequence in a group is first identified, and all the shorter sequences that overlap with the longest sequence are merged into the sequence. As a result, each group generates at least one long sequence that defines a similar passage in the source document, at least a portion of which is shared with target documents. In still another embodiment, the sequences are considered in order of position, starting with the sequence at the earliest position in the source document. If there are multiple sequences at that position, the longest sequence is selected and all shingles that overlap with the selected sequence are merged. Then, the next sequence in position order that has not yet been merged is considered and the merging process repeats. In some embodiments, sequences from adjacent groups are merged. For example, sequences from different groups might be merged if they are very close and/or there is evidence that they are related but separated due to things like OCR errors, minor textual variations, etc.

Referring back to FIG. 8, the sample workspace 800 is used in the following description to illustrate how sequence merging 414 is performed according to one embodiment. In the case of group A 814, the passage mining engine 116 first identifies the longest sequence 818 starting at the earliest position, and then merges other shorter, overlapping sequences, 820, 822, and 824, into the sequence 818 to form sequence 832. Similarly for group B 816, the passage mining engine 116 merges sequences 826 and 830 into the earliest sequence 828 to form a long sequence 834. Sequences 832 and 834 define similar passages in document $SD_i$, which or a portion of which also appears in target documents such as $TB_j$ and $TB_h$. These similar passages can be displayed in association with the source document $SD_i$. The pre-merge sequences such as 820, 822 and 824 define the portions of the similar passages that are shared by different target documents, which can be displayed at respective target documents such as $TB_h$ and $TB_n$.

In one embodiment, a sequence must be longer than a given length, for example, 12 words, to be merged with other sequences. Those sequences that are shorter than the given length may represent common phrases and colloquialisms. Such short sequences are discarded before any merging process takes place. In another embodiment, a shorter sequence must overlap with a long sequence by at least a certain number of words, for example, two words, in order to be merged into the long sequence. In yet another embodiment, the sequences can be merged across groups if the source gap is smaller than a certain number of words, for example, three words.

In one embodiment, the passage mining engine 116 ranks 416 the passages. An embodiment of the passage mining engine 116 uses heuristics that consider both passage length and occurrence frequency to identify the most "interesting" passages in a source document. Other factors such as language quality, coherence, content relevance, etc. may also be included in the heuristics. Each passage is given a score based on the same metric. The passages having higher scores are ranked higher. In one embodiment, the passages whose scores are higher than a pre-defined number are selected to be displayed as a list of popular passages, and the passages are displayed in the order of their scores with the highest-scored passage being displayed on the top of the list. In another embodiment, the top N (a pre-defined integer) highest-scored passages are selected to be displayed. In yet another embodiment, a combination of these techniques is used to select passages, i.e., select all the passages that score higher than a pre-defined number, but never select more than N passages.

In one embodiment, the metric uses a weighted geometric mean of a passage length score, LS(length), and a passage frequency score, FS(frequency), i.e., score=power(LS (length), LW)*power(FS(frequency), FW), where the coefficients LW and FW are the weights given to the length score and the frequency score, respectively, "power(x, y)" is a function returning x to the power of y, and LW+FW=1. According to one embodiment, LW=0.7 and FW=0.3, although other embodiments use different weights. Since short frequent passages are often common phrases and long infrequent passages are often collections and editions, in some embodiments different formula are implemented for the length and frequency scoring functions. These functions exclude from the ranking those passages that are either very short or very long, and either too frequent or too infrequent. For example, passages are ranked only if they have more than 10 and less than 100 words with a frequency between 1 and 1000, according to one embodiment.

FIG. 9 illustrates a sample web page 900 generated by the web server 120 and presenting information about the book "Six Degrees of Separation." In one embodiment, this web page 900 is generated by the User Interface module 124. The page 900 is separated into several regions. A title region 910 displays the title and author of the book. A summary region 912 displays summary information for the book including an image 914 of the book cover and an "About this Book" link 916. Users can click on the link 916 to obtain more information about the book, for example, a summary of the content, key words and phrases, publishing year and publisher.

A passage presentation region 918 shows the highest ranked passages in the book. These passages are selected based on the results of the passage ranking 416 in order to limit the number of passages shown at once and thereby increase the comprehension and utility of the passage presentation. In the sample web page 900, the passage presentation region 918 shows three of the highest ranked passages in the book.

For each passage, a passage subregion 920 displays the passage 922, page number 924 with a link to the page where the passage appears in the book, and popularity information 926 with a link to other documents in which the passage appears. A user can click on the page number link 924 and view the context of the passage shown in a text region 928. This allows the user to jump to different sections of the book to read the most popular passages and their context. A user can also click on the popularity information link 926, and the current browser window will allow the user to navigate to the other documents and the specific pages that share the passage. Other options such as opening a new browser window for displaying information related to other documents are used in some embodiments.

Figure 10:
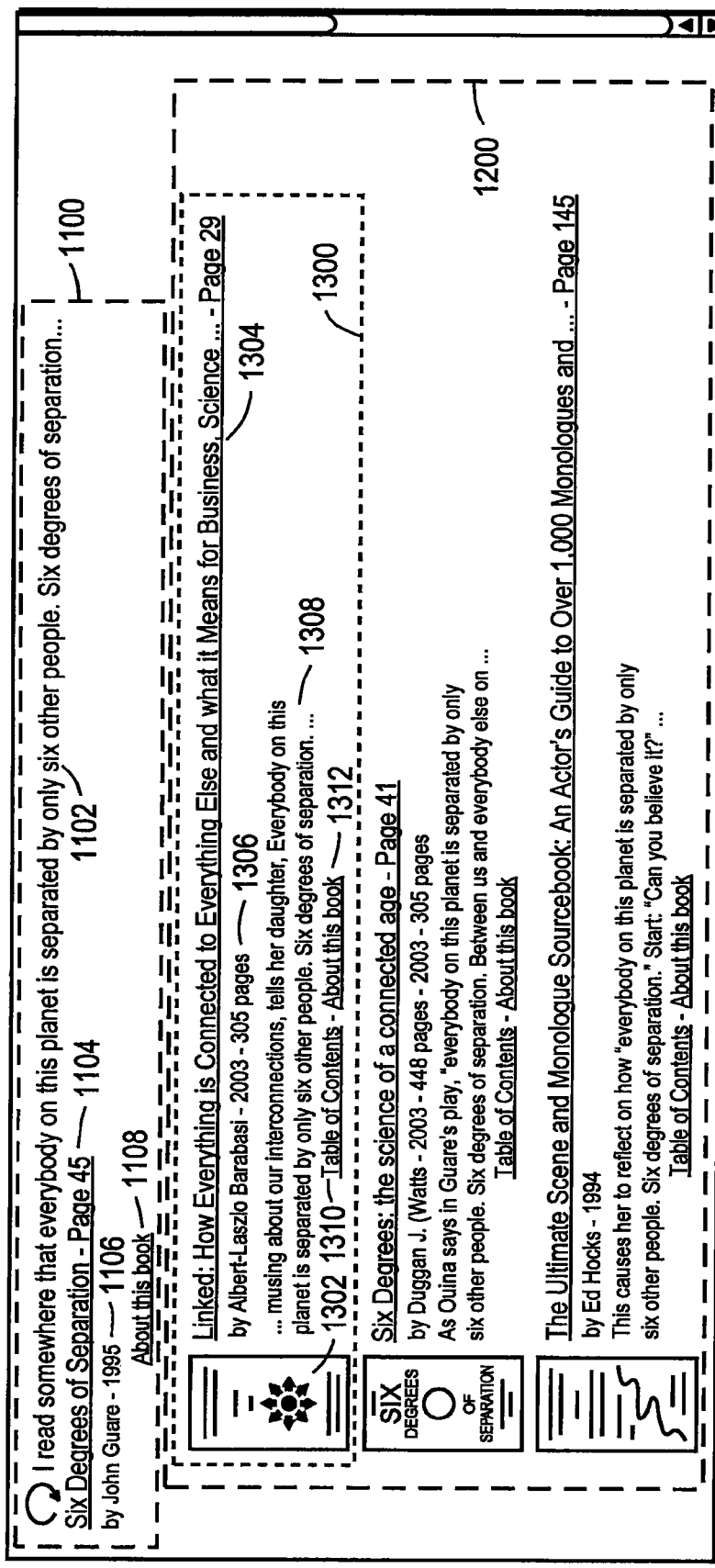
FIG. 10 illustrates a sample web page presenting information about other books sharing a passage with the book "Six Degrees of Separation."

FIG. 10 illustrates a sample web page 1000 that is generated by the web server 120 when a user clicks on the popularity link 926 in FIG. 9. In one embodiment, this web page 1000 is generated by the User Interface module 124. The page 1000 is separated into several regions. A source region 1100 displays information about the book "Six Degrees of Separation." A target region 1200 displays information about other documents that share the passage "I read somewhere that everybody on this planet is separated by only six people . . . ." The target region 1200 is further divided into sub-regions 1300, each of which presents information about one of the other documents, for example, the book "Six Degrees: the science of a connected age."

The source region 1100 displays the popular passage 1102 as it appears in the source book, a link 1104 to the page of the source book where the passage appears, author/publishing year information 1106, and an "About this book" link 1108. Users can click on the link 1108 to obtain more information about the source book.

The target sub-region 1300 displays information for a given target document including, an image 1302 of the document cover, a link 1304 to the page of the target document where the passage appears, information about the author/publishing year/total page number 1306, the context 1308 of the passage in the target document, a "Table of Contents" link 1310, and an "About this book" link 1312. Users can click on link 1310 to obtain the table of contents for the target document, and click on link 1312 to get more information about the document.

As illustrated in FIG. 9 and FIG. 10, a link structure based upon popular passages enables a user to browse documents by related concepts in a manner similar to how one navigates the web. It also provides guidance when a user wants to only skim the most interesting parts of a book before deciding whether to read it.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method of identifying similar passages in a plurality of documents stored in a corpus, comprising:

building a shingle table identifying shingles found in the corpus, identifying one or more documents in which the identified shingles appear, and identifying locations in the identified documents where the identified shingles occur;

for a target shingle in a source document, identifying, using the shingle table, one or more documents in the corpus which include the target shingle;

identifying, using the shingle table, a next shingle in the source document, wherein the next shingle is in a position occurring immediately after the target shingle;

identifying, using the shingle table, a subset of the identified documents which include the next shingle in a position occurring immediately after the target shingle;

defining a sequence of multiple contiguous shingles that appears in the source document and the identified subset of documents, the sequence of multiple contiguous shingles comprising at least the target shingle and the identified next shingle;

merging overlapping shingles in the defined sequence of multiple contiguous shingles to form a merged sequence;

defining a similar passage in the source document based at least in part on the merged sequence; and storing data describing the similar passage.

2. The method of claim 1, wherein building a shingle table comprises:

identifying a set of sequentially-ordered shingles occurring in a document in the corpus, each shingle including a group of adjacent words occurring in the document, and contiguous shingles including groups of words differing by two words;

describing, in the shingle table, distinct shingles in the document; and describing, in the shingle table and for each distinct shingle in the shingle table, one or more locations in the document where the shingle occurs.

3. The method of claim 2, wherein building a shingle table comprises building a distinct shingle table for each document in the corpus.

4. The method of claim 2, wherein building a shingle table comprises building a shingle table for multiple documents in the corpus.

5. The method of claim 1, wherein defining a sequence of multiple contiguous shingles that appears in the source document and the identified subset of documents further comprises:

identifying, using the shingle table, a first shingle occurring in a position after the target shingle that occurs in only the source document;

defining a source gap associated with the first shingle; and defining the sequence of multiple contiguous shingles based on the target shingle and the source gap.

6. The method of claim 1, further comprising:

ranking the similar passage relative to other similar passages in the source document.

7. The method of claim 6, wherein ranking the similar passage comprises:

calculating a score for the similar passage based, at least in part, on a length of the passage and frequency that the similar passage occurs in other documents in the corpus.

8. The method of claim 1, further comprising:

displaying a user interface having a passage presentation region showing the similar passage in association with the source document.

9. The method of claim 1, further comprising:

displaying a user interface displaying the similar passage; and providing a hypertext link that, upon selection, allows a user to navigate to another document in the corpus having the similar passage.

10. A computer program product having a computer-readable storage medium having computer executable program code embodied therein for identifying similar passages in a plurality of documents stored in a corpus, comprising:

a shingling module configured to build a shingle table identifying shingles found in the corpus, identifying one or more documents in which the identified shingles appear, and identifying locations in the identified documents where the identified shingles occur;

a sequencing module configured to:

identify for a target shingle in a source document, using the shingle table, one or more documents in the corpus which include the target shingle, identify, using the shingle table, a next shingle in the source document, wherein the next shingle is in a position occurring immediately after the target shingle, identify, using the shingle table, a subset of the identified documents which include the next shingle in a position occurring immediately after the target shingle, and define a sequence of multiple contiguous shingles that appears in the source document and the identified subset of documents, the sequence of multiple contiguous shingles comprising at least the target shingle and the identified next shingle;

a merging module configured to merge overlapping shingles in the defined sequence of multiple contiguous shingles to form a merged sequence;

a similar passage module configured to define a similar passage in the source document based on at least in part on the merged sequence; and a data store configured to store data describing the similar passage.

11. The computer program product of claim 10, wherein the shingling module is further configured to:

identify a set of sequentially-ordered shingles occurring in a document in the corpus, each shingle including a group of adjacent words occurring in the document, and contiguous shingles including groups of words differing by two words;

describe, in the shingle table, distinct shingles in the document; and describe, in the shingle table and for each distinct shingle in the shingle table, one or more locations in the document where the shingle occurs.

12. The computer program product of claim 11, wherein the shingling module is further configure to build a distinct shingle table for each document in the corpus.

13. The computer program product of claim 11, wherein the shingling module is further configured to build a shingle table for multiple documents in the corpus.

14. The computer program product of claim 10, further comprising:

a ranking module configured to rank the similar passage relative to other similar passages in the source document.

15. The computer program product of claim 14, wherein the ranking module is further configured to:

calculate a score for the similar passage based, at least in part, on a length of the passage and frequency that the similar passage occurs in other documents in the corpus.

16. The computer program product of claim 10, further comprising:

a user interface module configured to display a user interface having a passage presentation region showing the similar passage in association with the source document.

17. A computer system for identifying similar passages in a plurality of documents stored in a corpus, comprising:

a shingling module configured to build a shingle table identifying shingles found in the corpus, identifying one or more documents in which the identified shingles appear, and identifying locations in the identified documents where the identified shingles occur;

a sequencing module configured to:

identify for a target shingle in a source document, using the shingle table, one or more documents in the corpus which include the target shingle, identify, using the shingle table, a next shingle in the source document, wherein the next shingle is in a position occurring immediately after the target shingle, identify, using the shingle table, a subset of the identified documents which include the next shingle in a position occurring immediately after the target shingle, and define a sequence of multiple contiguous shingles that appears in the source document and the identified subset of documents, the sequence of multiple contiguous shingles comprising at least the target shingle and the identified next shingle;

a merging module configured to merge overlapping shingles in the defined sequence of multiple contiguous shingles to form a merged sequence;

a similar passage module configured to define a similar passage in the source document based on at least in part on the merged sequence; and a data store configured to store data describing the similar passage.

18. The computer system of claim 17, wherein the shingling module is further configured to:

identify a set of sequentially-ordered shingles occurring in a document in the corpus, each shingle including a group of adjacent words occurring in the document, and contiguous shingles including groups of words differing by two words;

describe, in the shingle table, distinct shingles in the document; and describe, in the shingle table and for each distinct shingle in the shingle table, one or more locations in the document where the shingle occurs.

19. The computer system of claim 18, wherein the shingling module is further configure to build a distinct shingle table for each document in the corpus.

20. The computer system of claim 18, wherein the shingling module is further configured to build a shingle table for multiple documents in the corpus.

21. The computer system of claim 17, further comprising:

a ranking module configured to rank the similar passage relative to other similar passages in the source document.

22. The computer system of claim 21, wherein the ranking module is further configured to:

calculate a score for the similar passage based, at least in part, on a length of the passage and frequency that the similar passage occurs in other documents in the corpus.

23. The computer system of claim 17, further comprising:

a user interface module configured to display a user interface having a passage presentation region showing the similar passage in association with the source document.

* * * * *